Patented Oct. 17, 1950

2,525,793

UNITED STATES PATENT OFFICE 2,525,793

ORGANIC COMPOUND AND METHOD OF PREPARING SAME

William F. Gresham and Richard E. Brooks, Wilmington, Del., assignors to E. I. du Pont de Nemours & Company, Wilmington, Del., a corporation of Delaware No Drawing. Application October 25, 1947, Serial No. 782,222

8 Claims. (Cl. 260—615)

This invention relates to the synthesis of tetraalkoxypropanes and methods of preparing the same. More particularly, the invention pertains to the preparation of tetraalkoxypropanes by reaction between 1,1,2-trialkoxyethanes, CO and $H_2$. This application is a continuation-in-part of our copending application S. N. 670,525, filed May 17, 1946 now Patent 2,429,878. This application is also a continuation-in-part of our copending application S. N. 680,072, filed June 28, 1946 now Patent 2,449,470, which discloses a process for the synthesis of 1,1,2-trimethoxyethane by heating methylal with carbon monoxide and hydrogen in the presence of methanol at elevated temperatures and pressures in the presence of a reduced cobalt oxide catalyst. Moreover, the synthesis disclosed in the said application provides the starting material which, in preferred embodiments, is employed in the practice of this invention.

An object of the invention is to provide new and useful compositions of matter, obtainable from 1,1,2-trimethoxyethane and like 1,1,2-trialkoxyethanes. Another object is to provide, from compositions readily derived from carbon monoxide and hydrogen, an inexpensive intermediate for the synthesis of glycerine. Other objects will appear hereinafter.

The objects are accomplished in accordance with this invention by carrying out novel reactions which, in specific embodiments, may be written as follows:

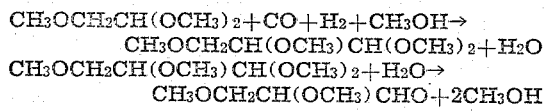

It is to be understood that corresponding reactions take place when the methoxyl groups in the reactants (and therefore in the reaction products) are replaced in whole or in part by other alkoxy groups, suitably containing less than about six carbon atoms per alkoxy group.

In general, the reaction between 1,1,2-trimethoxyethane, carbon monoxide, hydrogen and methanol is conducted, according to the invention, at a temperature of at least 50° C., preferably about 100° to 250° C. The pressure should preferably be at least one atmosphere, relatively high superatmospheric pressures (50 to 3000 atmospheres) being preferred. Best results are observed at pressures of 1100 to 1500 atmospheres.

Any suitable hydrogenation catalyst may be employed in the reaction between the 1,1,2-trialkoxyethane, e. g. 1,1,2-trimethoxyethane, carbon monoxide, hydrogen and methanol. The best catalysts contain cobalt and/or nickel. It is not necessary that the cobalt and/or nickel be in the metallic state. In fact, it has been found, in accordance with the invention, that the nickel and/or cobalt can be combined in very widely differing forms without losing its catalytic activity. Thus, cobalt salts of organic acids are highly effective, and very wide variations in the nature of the organic acid have been found to have virtually no effect upon the activity of the catalyst. A suitable soluble catalyst is cobalt naphthenate. The catalyst need not be soluble, of course, but may also be used as a suspended or granular solid.

The synthesis of

can be effected in one step from methylal, methanol, carbon monoxide, and hydrogen if desired, using a cobalt-containing or nickel-containing catalyst under the conditions described above. Somewhat better yields are generally obtained, however, by first preparing the 1,1,2-trimethoxyethane and thereafter converting it to

as described herein.

The invention is further illustrated by means of the following example.

*Example.*—Methylal (0.5 mol) and methanol (5 mols) were heated in a shaker tube containing a reduced cobalt oxide catalyst, and a 1:1 (mol ratio) mixture of carbon monoxide and hydrogen was introduced. The resulting reaction was continued at 160° to 170° C., at a pressure of 600 to 750 atmospheres for 15 minutes. Distillation of the resulting product gave 1,1,2-trimethoxyethane (33% conversion based on methylal charged; 90–100% yield based on methylal consumed). A quantity of 1,1,2-trimethoxyethane (0.4 mol) prepared as above described, was heated with methanol (2.4 mols), cobalt naphthenate (4% of the weight of methanol), and a 1:2 (mol ratio) mixture of carbon monoxide and hydrogen at 122° to 127° C. under 1150 to 1500 atmospheres pressure for 30 minutes. Distillation of the resulting product gave 1,1,2,3-tetramethoxypropane (B. P., 178° C.; conversion, 26.5% based on 1,1,2-trimethoxyethane charged; yield, 81.3%.

The foregoing example is illustrative only and should not be interpreted as necessarily limiting the invention. The conditions of the novel synthesis can be varied widely without departing from the spirit and scope of the invention. Thus the CO:H$_2$ ratio may be varied quite widely in the synthesis of the reaction product, good results being obtained when this ratio is within the range of 1:3 to 3:1.

The tetramethoxypropane obtained as above disclosed yields, on acid hydrolysis, an aldehyde, viz. alpha, beta-dimethoxypropanal, which is useful as a glycerine intermediate. The dimethyl ether of glycerine, obtained by hydrogenation of this aldehyde, is converted to glycerine by acid hydrolysis or by reaction with hydrogen chloride.

We claim:

1. A process for the synthesis of 1,1,2,3-tetramethoxypropane which comprises reacting 1,1,2-trimethoxyethane with carbon monoxide, hydrogen, and methanol in the presence of a hydrogenation catalyst, and thereafter separating 1,2,3-tetramethoxypropane from the resulting mixture.

2. A process for the synthesis of 1,1,2,3-tetramethoxypropane which comprises reacting 1,1,2-trimethoxyethane with carbon monoxide, hydrogen, and methanol in the presence of a cobalt-containing catalyst, and thereafter separating 1,1,2,3-tetramethoxypropane from the resulting mixture.

3. A process for the synthesis of 1,1,2,3-tetramethoxypropane which comprises reacting 1,1,2-trimethoxyethane with carbon monoxide, hydrogen, and methanol in the presence of a cobalt-containing catalyst, at a temperature of at least 50° C. under superatmospheric pressure, and thereafter separating 1,1,2,3-tetramethoxypropane from the resulting mixture.

4. A process for the synthesis of 1,1,2,3-tetramethoxypropane which comprises reacting 1,1,2-trimethoxyethane with carbon monoxide, hydrogen, and methanol in the presence of a cobalt-containing catalyst, at a temperature of 100° to 250° C. under a pressure of from 50 to 3000 atmospheres, and thereafter separating 1,1,2,3-tetramethoxypropane from the resulting mixture.

5. The process set forth in claim 4 in which the said catalyst is a cobalt salt of an organic carboxylic acid.

6. The process set forth in claim 4 in which the said catalyst is cobalt naphthenate.

7. The process set forth in claim 4 in which the initial mol ratio of CO:H$_2$ is 3:1 to 1:3.

8. A process for the synthesis of 1,1,2,3-tetramethoxypropane which comprises reacting 1,1,2-trimethoxyethane with carbon monoxide, hydrogen, and methanol in the presence of a cobalt-containing catalyst, at a temperature within the range of 100° to 250° C. under a pressure within the range of 1100 to 3000 atmospheres, and thereafter separating 1,1,2,3-tetramethoxypropane from the resulting mixture.

WILLIAM F. GRESHAM.
RICHARD E. BROOKS.

REFERENCES CITED

The following references are of record in the file of this patent:

UNITED STATES PATENTS

| Number | Name | Date |
|---|---|---|
| 2,429,878 | Gresham et al. | Oct. 28, 1942 |

Certificate of Correction

Patent No. 2,525,793　　　　　　　　　　　　　　　　　　　October 17, 1950

WILLIAM F. GRESHAM ET AL.

It is hereby certified that error appears in the printed specification of the above numbered patent requiring correction as follows:

Column 3, line 17, for "1,2,3-" read *1,1,2,3-*;

and that the said Letters Patent should be read as corrected above, so that the same may conform to the record of the case in the Patent Office.

Signed and sealed this 2nd day of January, A. D. 1951.

[SEAL]

THOMAS F. MURPHY,
*Assistant Commissioner of Patents.*